United States Patent [19]
Saad

[11] Patent Number: 4,679,328
[45] Date of Patent: Jul. 14, 1987

[54] LETTERING TEMPLATE

[76] Inventor: Michael Saad, 1600 Windermere Dr., Arlington, Tex. 76014

[21] Appl. No.: 872,811

[22] Filed: Jun. 11, 1986

[51] Int. Cl.$^4$ .............................................. B43L 13/02
[52] U.S. Cl. ........................................ 33/447; 33/566
[58] Field of Search ..................... 33/443, 447, 566; 434/117

[56] References Cited

U.S. PATENT DOCUMENTS

| | | | |
|---|---|---|---|
| 553,504 | 1/1896 | Bennett | 33/443 |
| 2,530,437 | 11/1950 | Marks | 434/117 |
| 2,562,479 | 7/1951 | Spikes | 33/443 |
| 3,346,960 | 10/1967 | Miles | 33/443 X |
| 3,899,839 | 8/1975 | Essmann | 434/117 |
| 3,949,492 | 4/1976 | Less | 434/117 |
| 4,223,447 | 9/1980 | Greenlees | 33/443 |

Primary Examiner—Harry N. Haroian
Attorney, Agent, or Firm—Stanley R. Moore

[57] ABSTRACT

A writing template comprising a planar surface and slotted lettering guide movably mounted thereon. The lettering guide is mounted upon the planar surface for rectilinear movement along a plurality of parallel steps. The planar surface includes a clip disposed on the upper end thereof for securing paper beneath the slotted template. An indexing mechanism is also provided whereby the slotted template may be momentarily lowered for facilitating the creation of a lowercase letter such as g, j, p, q and y. In this manner penmanship may be improved and writing skills enhanced by an inexpensive writing guide which assists in the creation of both uppercase and lowercase letters.

9 Claims, 5 Drawing Figures

LETTERING TEMPLATE

BACKGROUND OF THE INVENTION

1. Field of the Invention

The present invention pertains to lettering templates and, more particularly, to a writing guide facilitating the generation of uppercase and for lowercase letters.

2. History of the Prior Art

Penmanship is an integral part of education necessary for proper communication of ideas both in teaching and in learning. Unfortunately, little academic emphasis is given to penmanship and proper stylistic forms of lettering following elementary educational levels. For this reason it is imperative that basic penmanship skills be developed at a very early age. Since proper penmanship requires the ability to form both upper and lowercase letters within a predefined space in a stylistic manner, templates and related slotted printing devices are often used. These devices assist in the formation of individual letters in various manners.

The prior art is replete with devices for assisting individuals in lettering. These devices include both preformed letter templates as well as apertures adapted for facilitating formation of the vertical, horizontal and angulated portions of various letters. For example, U.S. Pat. No. 3,740,872 issued to Mayo sets forth and shows a writing template adapted for facilitating the formation of various letters of the alphabet with a pencil, pen or similar writing instrument. While useful in the creation of capital letters, such templates do not afford the writer access to the region beneath the lettering slot for lower case letters having depending portions, to wit: y, g, j, q and p. Other prior art devices include those set forth and shown in U.S. Pat. Nos. 672,087 to Williams, et al., 523,906 to Rush and 2,016,985 to Carlson which also teach penmanship devices adapted for enhancing writing skills.

The utilization of a generally rectangular slot for facilitating printing of upper and lower case letters has been used for many years. The correct formation of a letter such that the top and bottom portions of adjacent letters are each co-planar is a well known, desirable aspect. For this reason conventional school notebook paper contains a plurality of parallel lines adapted for facilitating writing thereon. In elementary school grades the lines generally include an upper and lower case marking to allow the student to generate the lower portion of those letters of the alphabet having a depending section. Slotted templates while providing assistance in establishing proper letter height and spacing, inhibit the creation of such lower case letters. For this reason such slotted members are often not used due to the need for speed and efficiency in the writing process. The devices of the prior art while assisting students in penmanship are limiting in their ability to assist in the generation of the aforesaid lower case letters. As stated above, this "inability" often becomes the deciding factor in not using such templates. The failure to utilize a template in early educational phases often leads to non-uniform letter formation and sloppy penmanship. It would thus be an advantage to provide a lettering guide which accommodates the formation of the five lower case letters of the alphabet necessitating room for forming the depending portion thereof.

The present invention overcomes the problems of the prior art by providing a slotted lettering template having a window formed therein with a rectilinearly movable member disposed thereacross. The movable member contains a slotted portion facilitating upper and lower case lettering and may be depressed for allowing the generation of the depending region of the five lower case letters. Spring actuation means and an integral guidance mechanism maintains the parallel relationship of the template upon the writing paper disposed therebeneath. In this manner, proper penmanship skills are taught while affording the generation of all twenty-six letters of the alphabet in both upper and lower case forms.

SUMMARY OF THE INVENTION

The present invention pertains to a lettering template comprising a slotted window adapted for rectilinear movement facilitating the formation of lower case letters. More particularly, one aspect of the invention comprises a writing template comprising a planar substrate, means disposed atop the planar substrate for securing writing material thereon, and a slotted member disposed upon the substrate adapted for rectilinear movement. Means are provided for mounting the slotted member upon the substrate and permitting the rectilinear movement thereof in a plurality of parallel spaced steps. Means are also provided for moving the slotted member a select distance for permitting the formation of lower case letters. The mounting means comprises a plate having a window formed therethrough adapted for receiving the elongate slotted member and adapted for vertical movement therealong and rectilinear motion for facilitating the creation of lower case letters.

In another aspect, the invention described above further includes a planar substrate comprising a clipboard with a clip for holding paper thereon. The means for maintaining the slotted member in parallel spaced relationship also comprises first and second tracks disposed on opposite sides of the substrate. The tracks are adapted for engaging the slotted member across the substrate. The means for moving the slotted member within the window comprises a guide adapted for receiving the slotted member therein. Spring means are coupled to the guide for biasing the slotted member upwardly. Handle means are coupled to the slotted member for facilitating the depression thereof and movement within the apertured window.

In yet another aspect, the invention includes an improved writing template of the type wherein a slot is provided for facilitating the formation of alphabetical letters within a predefined height parameters. The slotted member is adapted for movement relative to writing material for allowing the generation of sentences or series of letters thereupon and is disposed in association with a planar substrate adapted for securement of paper thereon. The improvement comprises the slotted member having a first body region constructed with a central window therein and a second slotted face reciprocally mounted therein. The second slotted face includes at least one elongate lettering slot formed horizontally thereacross. The slot face is adapted for reciprocal movement and monetary depression for the formation of the lower region of lower case letters during lettering of g, j, p, q, y.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figures 1, 2:
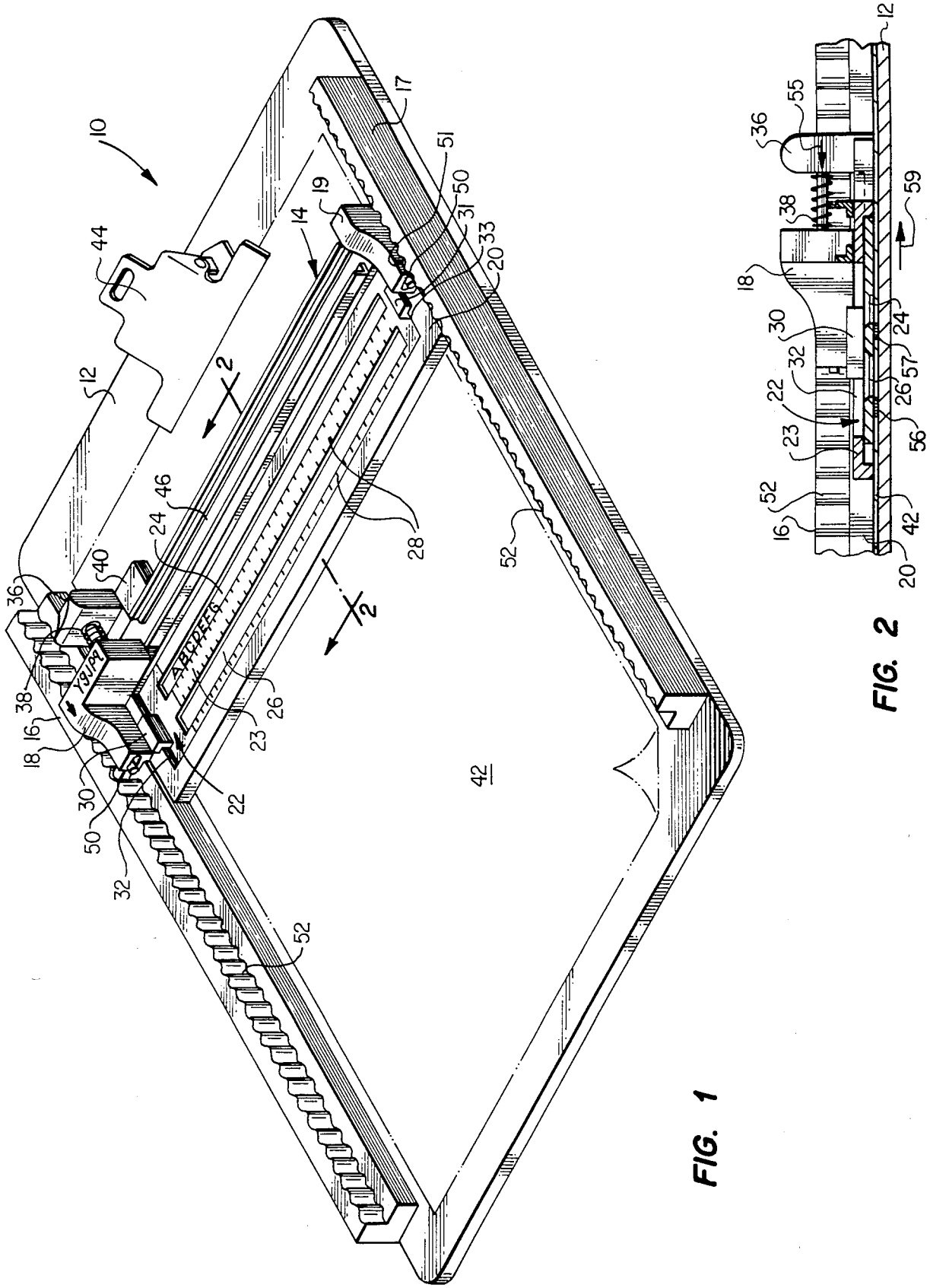
FIG. 1 is a perspective view of one embodiment of the lettering template constructed in accordance with the principles of the present invention.
FIG. 2 is an enlarged, side-elevational, cross-sectional, fragmentary view of the lettering template of FIG. 1 taken along lines 2—2 thereof.

Referring first to FIG. 1, there is shown a perspective view of the template 10 of the present invention comprising a planar substrate 12 and adjustable template 14. The adjustable lettering template 14 is adapted for rectilinear motion upon the substrate 12 and engagement with oppositely disposed, parallel tracks 16 and 17 to which the template 14 is mounted. Engagement and positioning mechanisms 18 and 19 are disposed on opposite lateral side portions of template 14 for mating engagement with sections of tracks 16 and 17, respectively. Still referring to FIG. 1, the body of the template 14 is comprised of a plate or base member 20 having a generally rectangular window 22 formed therein. A slotted member 23 is mounted within the window 22 and is constructed with an upper slot 24 and lower slot 26. The slots 24 and 26 are constructed for facilitating the introduction of a writing member, such as a pen or pencil, therein and facilitating good penmanship during the formation of letters within the defined borders of the respective slots. A series of indicia 28 are presented adjacent the edges of the slots 24 and 26 for further assisting the user in penmanship skills.

Still referring to FIG. 1, the template assembly 10 is constructed for enabling the user to write all 26 letters of the alphabet in the upper and lowercase styles. The completion of lowercase letters g, j, p, q, and y necessitates extending the letter beneath the base line of the stationary slot 24 or 26. The present invention facilitates this step in the letter formation by permitting secondary rectilinear motion of the slotted member 23 within the window 22. Oppositely disposed guide means 30 and 31 are thus constructed upon the slotted member 23 for engagement with the side edges 32 and 33 of the window 22. A depression lever, or arm 36 is provided in the upper lefthand portion of the template 14 and is coupled directly to the slotted member 23 for moving it downwardly during the formation of the aforesaid depending region of the lowercase letters g, j, p, q and y. A spring mechanism 38 is likewise provided for biasing the slotted member 23 upwardly in its stationary position within the window 22. Movement of the depression arm 36 is likewise guided for maintaining the parallel relationship of the respective members within the assembly 10 by arm guides 40 and 41 affixed to the plate 20. Paper 42 may therein be disposed beneath the base or plate 20 secured to the substrate 12 by a conventional fastener 44 for practice of penmanship in accordance with the principles of the present invention. A track 46 may also be provided along the top region of the plate 20 for bearing indicia such as sample letters, letter styles and phrases for printing during the practice session and use of the present invention 10.

Referring still to FIG. 1, the slotted member window 22 is formed in a generally rectangular configuration with side edges 32 and 33 disposed in generally parallel spaced relationship. Side engagement mechanisms 18 and 19 are constructed with track engagement means 50 comprising detent fingers 51 or the like. The fingers 51 engage mating teeth portions 52 of the parallel tracks 16 and 17 shown in FIG. 1 for purposes of maintaining the template 14 in a series of parallel positions upon the substrate 12. The fingers 51 are spring loaded to allow the base 20 to slide upon substrate 12 along parallel steps. For purposes of further facilitating the guidance of the slotted member 23 relative to base member 12, guide arms 40 and 41 are shown constructed in the upper lefthand corner of the plate 20. The lower case letters g, j, p, q and y are likewise engraved thereon for reminding the user of the need for depressing the slotted member 23 within the window 22 for completing lowercase letter formation.

Referring now to FIG. 2 there is shown an enlarged, side-elevational, cross-sectional view of the fragmentary portion of the writing template 10 of the present invention. The lateral track 16 is shown constructed with teeth 52 therein adapted for receiving engagement mechanism 18 for positioning therealong. Paper 42 is likewise shown disposed beneath the base member 20 having window 22 formed therein. The slotted member 23 is illustrated positioned within the window 22 having lower slot 26 and upper slot 24 constructed therethrough. The slotted member 23 is shown to be guided along side wall 32 by guide member 30 during the rectilinear movement and depression activated by lever or finger member 36. The upright position of the finger arm 36 is established by a biasing member or spring 38 or by a movement in the direction of arrow 55 allows rectilinear movement of the slots 26 and 24 within the window 22. The portion of the paper 42 disposed beneath the slotted member 23 which is exposed by the rectilinear depression of said slotted member is illustrated by shaded sections 56 and 57, which sections are exposed while the lever 36 is held in the depressed position in the direction of arrow 55. As discussed above, this depression is affected by manual movement and release of the pressure upon the lever 36 allows return of the slotted member 23 in the direction of arrow 59. In this manner, lower case letters g, j, p, q, and y can be formed in a very simple fashion with the paper 42 secured upon the substrate 12 as herein described.

Figure 3:
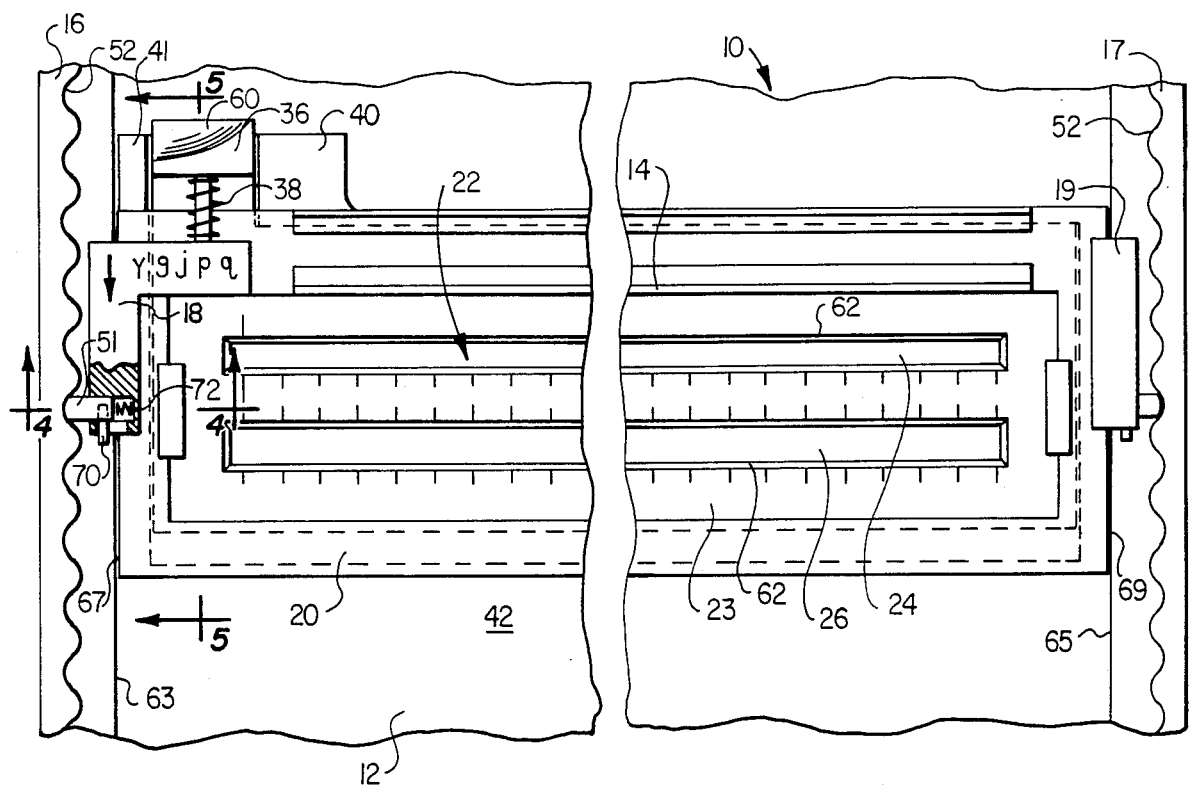
FIG. 3 is a top plan view of a portion of the lettering template of FIG. 1 with sections thereof cut away for purposes of illustration.

Referring now to FIG. 3 there is shown an enlarged top-plan view of the lettering template 10 of the present invention, the substrate 12 is thus illustrated with the base member 20 positioned thereon in generally parallel spaced relationship along a plurality of steps thereacross. The generally parallel spaced relationship is provided by the engagement mechanisms 18 and 19 which are also shown herein and more clearly illustrated as to their operation and engagement with oppositely disposed alignment tracks 16 and 17. The slots 24 and 26 of the slotted member 23 are likewise shown constructed with tapered side bar regions 62 adapted for facilitating the entry of a writing utensil such as a pen or pencil therein for the formation of a letter upon an underlying sheet of paper 42. The creation of the lowercase letters as described above is permitted by the application of pressure upon lever 36 which depresses spring 38 causing movement of the slotted member 23 within the window 22. A curved recess area 60 is shown to be constructed in the lever 36 for facilitating the positioning of the thumb or finger thereon and the resulting comfort of the user. It is important to point out that one of the advantages of the present lettering template 10 is convenience in creation of all twenty-six letters in upper and lowercase fashion. If the operation or actuation of the system 10 is not convenient to the user, then proper penmanship is not being taught but inherently inhibited. Such is the advance over the prior art due to the fact that the template 14 is easily slidable upon the substrate 12 and the paper 42 disposed therebeneath due to the fact that the engagement members 51 matingly engage the curved tooth formation 52 of each track member 16 and 17. For this reason the distal end of the member 51 is curved in mating engagement for self-centering within each valley of the tooth 52. A section of the engagement mechanism 18 is shown cut away at section 70 to reveal a spring 72 which biases the curved end engagement member 51 outwardly into the curved tooth portion 52. The generally parallel positioning of the template 14 then upon the substrate 12 is further enhanced by a slip fed engagement between the template 14 and the sidewalls of the track 16 and 17. Thus track 16 has an inside sidewall 63 disposed in generally parallel spaced relationship from inside wall 65 of oppositely disposed track 17. The body portion 20 of template 14 thus is constructed with an outer wall 67 adapted for slidable engagement against inside wall 63 along one edge and oppositely disposed, generally parallel spaced outer wall 69 adapted for slidable engagement against inner wall 65 of track 17. In this manner the template 14 is maintained in a parallel configuration throughout the rectilinear motion upon the substrate 12. This facilitates the formation of parallel lettering lines and/or sentences inscribed within the slots 24 and 26.

Figure 4:
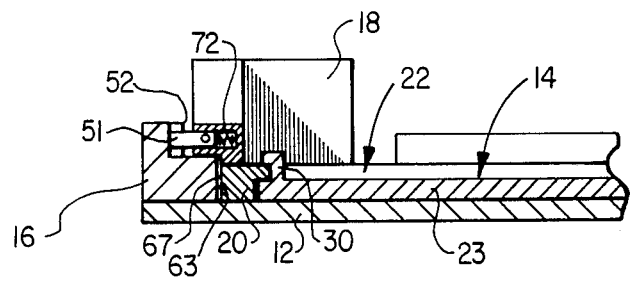
FIG. 4 is an enlarged, end-elevational, cross-sectional view of a side region of the lettering template of FIG. 3 taken along lines 4—4 thereof.

Referring now to FIG. 4 there is shown an enlarged, end-elevational, cross-sectional view of the engagement mechanism 18 of the present invention. The spring 72 is shown disposed in a hollow region thereof with engagement finger 51 extending outwardly thereof in engagement with a tooth 52 of track 16. Track 16 is constructed in a generally L-shaped configuration with an upstanding inside wall 63 in slidable mating engagement with outside wall 67 of body portion 20 of template 14. Sliding engagement therefore maintains a parallel relationship. Likewise the guide member 30 upstanding from the slotted member 23 is shown to engage the side wall of the base member 20 of the template 14 for maintaining a generally parallel spaced relationship during rectilinear movement thereof as discussed above.

Figure 5:
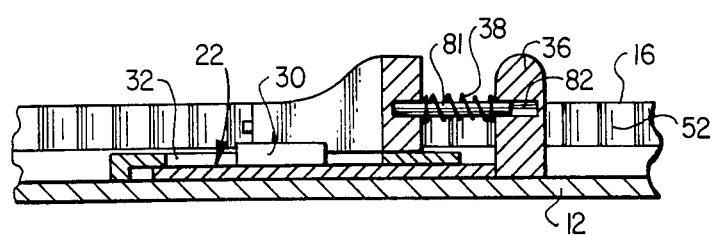
FIG. 5 is an enlarged, side-elevational, cross-sectional view of the lettering template of FIG. 3 taken along lines 5—5 thereof and illustrating the means therein for facilitating depression of the slotted member for creation of lower case letters in accordance with the principles of the present invention.

Referring now to FIG. 5 there is shown an enlarged, side-elevational, cross-sectional view of a portion of the writing template assembly 10 of the present invention illustrating one construction of the depression arm 36. The arm 36 is shown constructed with a spring member 38 mounted about a shaft 81, an aperture 82 is formed within the lever member 36 for entry of shaft therein. Movement of the lever member 36 thus imparts the requisite rectilinear movement to the slotted member 23 for formation of lowercase letters in the otherwise unexposed regions 56 and 57 as set forth in FIG. 2. Guide member 30 is more clearly illustrated in engagement of the side wall 32 of the base member 23, which relationship maintains the parallel sliding function of the slotted member 23. Without the slotted member actuation, it would not be possible to easily form the lowercase portions of the letter which greatly enhances penmanship during operation and use of the present invention.

It may thus be seen in viewing a combination of FIGS. 1-5 that the formation of the window 22 in the slidable template 14 allows a secondary rectilinear motion of the slotted member 23 relative to the underlying paper while the template 14 itself may be positioned for various lettering positions upon underlying paper 12. There are thus, two independent slide positions provided in accordance with the principles of the present invention. In combination these principles permit the user to practise lettering skills for all twenty-six letters of the alphabet in both upper and lowercase letter formation. The position of the lever arm 36 on the left hand portion of the lettering guide is, of course, presented for purpose of illustration only and for those who are left handed, the lever 36 would be constructed on the right portion (not shown) to allow the user to engage the lever 36 with the right hand. It may further be seen that the utilization of various designs of teeth 52 as well as engagement members 51 may be found. It is important to note, however, the configuration set forth herein affords ease and operation and manual movement. Because the particular system 10 is adapted for younger people learning the art of proper penmanship, it is necessary to provide a reliable yet durable assembly and one which is easy to operate. The teachings of the present invention afford such an assembly with the advantages of a more complex system.

It is thus believed that the operation and construction of the present invention will be apparent from the foregoing description. While the method and apparatus shown and described has been characterized as being preferred, it will be obvious that various changes and modifications may be made therein without departing from the spirit and scope of the invention as defined in the following claims.

What is claimed is:

1. A writing template for facilitating a generation of uppercase and lowercase letters by a user holding a writing member upon writing material with both primary and secondary rectilinear motion of said template, said template comprising:

a planar substrate adapted for receiving said writing material thereupon;

a slotted member disposed upon said substrate, having at least one slot and borders formed therearound for defining the area of writing with said writing member and adapted for rectilinear movement above said writing material;

means for mounting said slotted member upon said substrate, above said writing material and permitting a primary rectilinear movement thereof in a plurality of parallel spaced steps along said substrate; and means associated with said slotted member for moving said slotted member in a secondary rectilinear movement a select, incremental distance upon said writing material for permitting the formation of lowercase letters;

said moving means for said secondary rectilinear movement comprising a depression arm coupled to said slotted member; and said depression arm constructed with an area for receiving engagement of and pressure from a hand of the user to impart said secondary rectilinear movement said incremental distance and define said borders of said slot for said writing member in the generation of said lowercase letters.

2. The apparatus as set forth in claim 1 wherein said mounting means comprises a plate having a window formed therethrough adapted for receiving said slotted member therein and moving means associated with said slotted member being further constructed with a spring member for biasing said depression arm against said secondary rectilinear movement.

3. The apparatus as set forth in claim 1 and further including means disposed atop said planar substrate for securing writing material thereon.

4. the apparatus as set forth in claim 2 wherein said means for maintaining said mounting means in parallel spaced relationship along said plurality of space steps comprises first and second tracks disposed on opposite sides of said substrate adapted for engaging said mounting means thereacross.

5. The apparatus as set forth in claim 2 wherein said mounting means further comprises a guide adapted for receiving said slotted member therein.

6. The apparatus as set forth in claim 1 wherein said planar substrate comprises a clipboard.

7. The apparatus as set forth in claim 1 wherein said mounting means comprises a plate having a window formed therethrough adapted for receiving said slotted member therein, said slotted member being adapted for incremental vertical movement relative to said mounting means for facilitating the creation of lowercase letters, said mounting means further comprising a guide adapted for guiding said slotted member through said incremental vertical movements, spring means coupled to said guide for biasing said slotted member upwardly and a handle coupled to said slotted member for facilitating the depression thereof and movement within said apertured window.

8. The apparatus as set forth in claim 7 and further including means disposed atop said substrate for securing writing material thereon.

9. The apparatus as set forth in claim 8 wherein said planar substrate comprises a clipboard.

* * * * *